Patented June 2, 1931

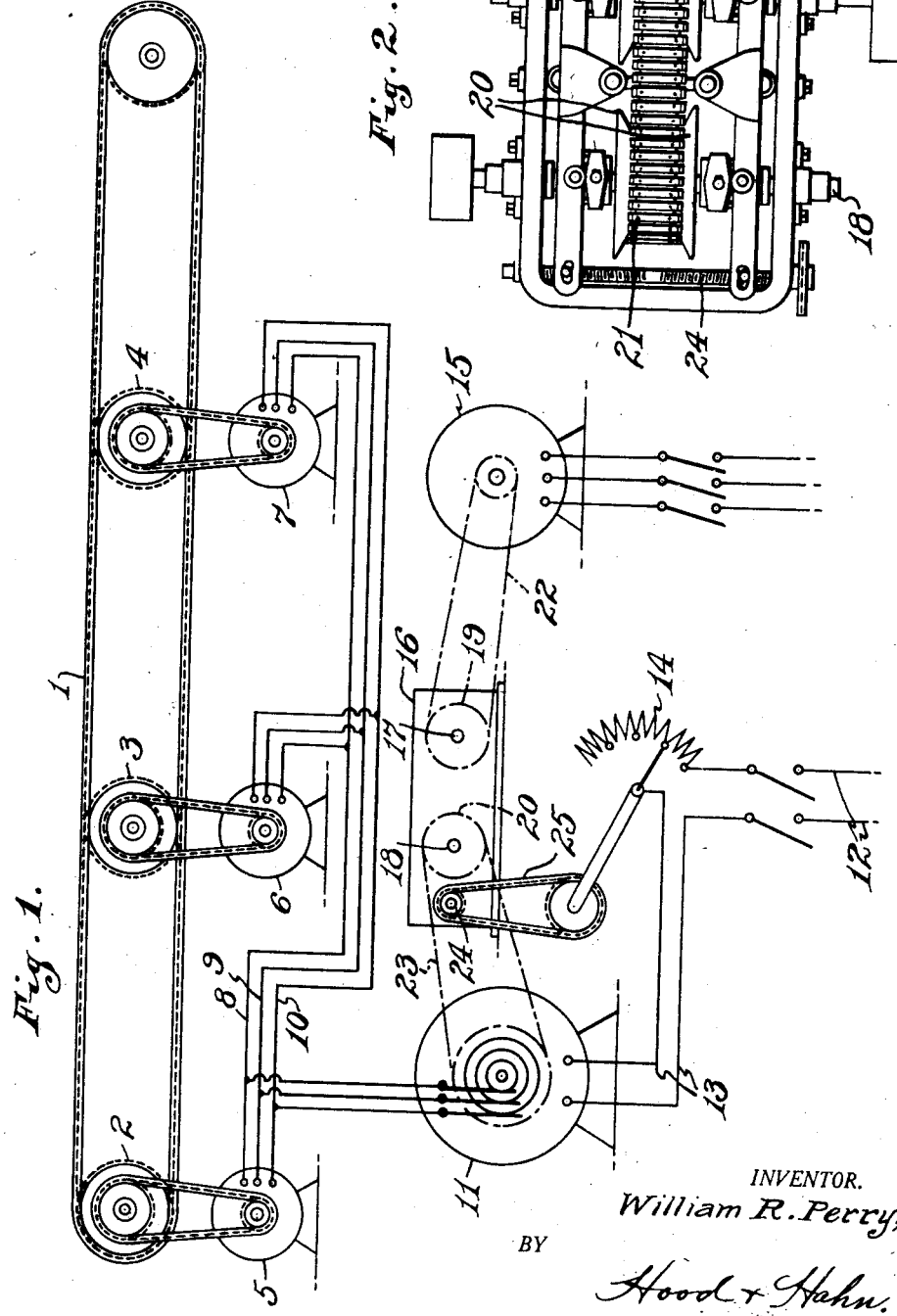

1,808,738

UNITED STATES PATENT OFFICE

WILLIAM R. PERRY, OF COLUMBUS, INDIANA, ASSIGNOR TO REEVES PULLEY COMPANY, OF COLUMBUS, INDIANA, A CORPORATION OF INDIANA

SEGREGATED DRIVE FOR LONG CONVEYERS

Application filed June 4, 1928. Serial No. 282,528.

My invention relates to a synchronous drive for a plurality of individual driven elements such for instance as a plurality of sprockets or driving members for a continuous conveyer or for a plurality of conveyers arranged in series and each of which is adapted to be driven at the same speed.

It has for one of its objects the provision of means for driving the individual driven members at a synchronous speed and controlling the speed of all of the members in synchronism.

It is particularly applicable for driving extremely long conveyers. As is well known the limit to the practical length of a conveyer is controlled by the strength of the conveyer belt or chain. This is necessarily so, as the driving strain is all imposed at one point and the increased length adds an increased strain on the conveyer. If the conveyer could be driven from a plurality of points each of the driving elements operating in exact synchronism with the remaining elements, the length of the conveyer, so far as it is dependent upon the strength of the belt or chain, is practically unlimited.

By my present invention I am enabled to provide means for driving a continuous conveyer at a plurality of points so that the driving load is distributed throughout the length of the conveyer.

For the purpose of disclosing my invention I have illustrated one embodiment thereof in the accompanying drawings in which—

Fig. 1 is a diagrammatic view of an embodiment of my invention, and

Fig. 2 is a plan view of a variable speed transmission used in connection with my invention.

In the embodiment illustrated the conveyer 1, which may be of any suitable type, is driven from the head sprocket 2 and additionally by intermediate sprockets 3 and 4 which are arranged at intermediate points throughout the length of the conveyer. Each of the sprockets 2, 3 and 4 is individually driven by the individual motors 5, 6 and 7 which are of the induction type connected in parallel from the three phase supply wires 8, 9 and 10, which circuit is supplied with current from the alternating current generator 11. The stator or field of this generator is supplied with a suitable exciting current from a source of supply 12 by the supply circuit 13 in which is arranged a rheostat 14 for controlling the voltage impressed on the stator or field winding. The generator 11 is driven by any prime mover, as a primary electric motor 15 through a suitable variable speed transmission 16. This transmission may be of that type known as the Reeves transmission wherein the driving force is delivered from the driving shaft 17 to the driven shaft 18 through the medium of two pairs of cone discs 19 and 20 and an intermediate driving belt 21 effective along its edge. The driving shaft 17 in the present instance has a belt drive connection 22 with the motor 15 and the driven shaft has a belt drive connection 23 with the A. C. generator. The variation in speed in this type of transmission is obtained by the relative axial shifting of two pairs of cones and the shifting mechanism 24 of the transmission in the present instance is drivingly connected through the medium of a belt or chain connection 25 with the rheostat 14, whereby the voltage of the generator 11 will be maintained at a predetermined value for each different speed.

I claim as my invention:

The combination with a plurality of driven elements, of a plurality of electric motors one for each of said elements, a generator for supplying current to all of said motors, means operating at a constant speed for driving said generator, means for controlling the current supplied to the field of said generator, a variable speed transmission for connecting said driving means and said generator, and connecting means between said variable speed transmission and said controller.

In witness whereof, I, WILLIAM R. PERRY have hereunto set my hand at Columbus, Indiana, this 31st day of May, A. D. one thousand nine hundred and twenty-eight.

WILLIAM R. PERRY.